Nov. 29, 1966  G. J. SHELDON  3,288,583
APPARATUS FOR PRODUCING OPTICAL FIBER
Filed June 7, 1962  2 Sheets-Sheet 1

INVENTOR.
GILBERT J. SHELDON
BY Frank E. Parker
Arthur L. Nelson
ATTORNEYS

INVENTOR.
GILBERT J. SHELDON
ATTORNEYS

United States Patent Office 3,288,583
Patented Nov. 29, 1966

3,288,583
APPARATUS FOR PRODUCING OPTICAL FIBER
Gilbert J. Sheldon, Irondequoit, N.Y., assignor to Bausch & Lomb Incorporated, Rochester, N.Y., a corporation of New York
Filed June 7, 1962, Ser. No. 200,814
2 Claims. (Cl. 65—11)

This invention relates to a method for making coated glass fibers and to the orifice for forming the glass fibers.

Various means have been used for transmitting an optical image to a remote point of observation. A bundle of glass fibers adapts itself readily to this type of use by providing a plurality of light paths each formed by the individual fibers. The fibers have very small diameters and include a core light transmitting section carrying a coating of material having a different refractive index from the core. With this type of light transmitting device the coating optically insulates the fiber from any external point relative to the fiber. A minimum of light is lost due to the coating surrounding each of the fibers.

A sufficiently small fiber is necessary for good image transmission. To manufacture of a large number of fibers oriented in the proper position presents a considerable problem. It is obvious that each of the fibers must be drawn at a rapid rate to reduce the cost of the overall device.

Accordingly, this invention is intended to provide a means for rapid forming of fibers which may be used in a suitable light transmitting device. The drawing of the fiber must be at a high speed and yet provide perfect fusion in the coating surrounding the core in each of the plurality of fibers in the device. The method of making the fibers covered under this disclosure requires that an accurate concentric alignment of orifices be maintained, and a predetermined temperature control is also maintained on the orifices. The temperature of the molten glass is sufficiently high to permit a flow of molten glass from each of the bodies supplying the glass for the core and the coating. The drawing of the fiber however is a more rapid rate of fluid movement than the natural flow through the orifice. The drawing of the fiber assists the discharge of molten glass through the orifice.

It is an object of this invention to provide a means of concentrically arranging bodies of molten glass for flowing to form a coated optical fiber.

It is another object of this invention to provide a central core orifice and a concentric coating orifice leading from their respective bodies of molten glass to supply glass for drawing into a fused unitized optical fiber.

It is a further object of this invention to provide a method of forming a coated optical glass fiber.

The objects of this invention are accomplished by placing a central body of molten glass in communication with a central orifice for provision of a flow of molten glass through the central orifice to form the core of a glass fiber. Concentrically located around the central body is a molten body of glass in communication with an annular orifice concentrically and accurately located around the central orifice to provide a continuous flow of molten glass for forming the coating on the drawn optical glass fiber. The concentricity of the two orifices is accurately manitained with a predetermined proportion of areas to provide the desired relationship of thicknesses of core relative to the coating. The temperature of the two molten bodies of glass are maintained within minute temperature changes to accurately control the rate of flow from each of the two orifices. A fiber is drawn from each of the two orifices at a rate faster than the normal rate of flow through the orifices. The fluid condition of the glass causes a perfect fusion of the coating surrounding the core and permit a rapid forming of a continuous glass fiber.

The preferred embodiment of this invention is illustrated in the attached drawings.

Figure 1:
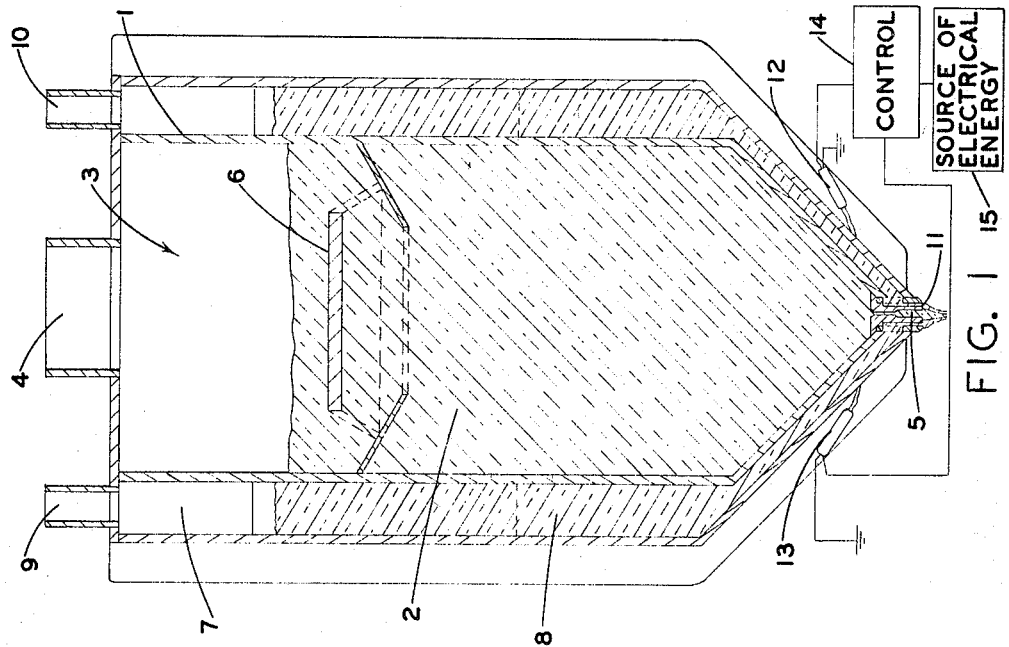
FIG. 1 illustrates a cross section view of the two pots for receiving the two bodies of molten glass together with the schematic diagram illustrating temperature control.

Referring to the drawings, FIG. 1 illustrates a cross section view of the two pots providing a means for containing a molten glass. The circular wall 1 encloses the body of molten glass 2 within the chamber 3. The glass is fed through the opening 4 into the chamber 3 at a predetermined rate controlled by the flow of glass through the orifice 5. The glass is fed into the opening 4 and deposited on the platform 6 where it is melted. As the glass changes into a molten state it is permitted to flow through the orifice 5 at a predetermined rate.

The body of the molten glass 2 forms a core of the glass fiber as it is drawn through the orifice 5. The glass is preferably of a different refractive index than that forming the coating.

Concentrically mounted around the chamber 3 is formed the second chamber 7 which receives the molten glass body 8. The glass is fed through the port 9 and 10 into the peripheral chamber 7. The glass is melted upon entrance into the chamber 7 and is then permitted to flow downwardly and is drawn through the annular orifice 11 surrounding the central orifice 5.

The temperature within the bodies of molten glass 2 and 8 is accurately controlled through the thermocouples 12 and 13. The thermo-couples 12 and 13 are positioned adjacent the orifices 5 and 11 and maintain a temperature on the orifices which permit only minute fluctuations of temperature. The thermo-couples 12 and 13 are electrically connected to the control unit 14 which regulates the flow of energy from the source electrical energy 15.

Figure 2:
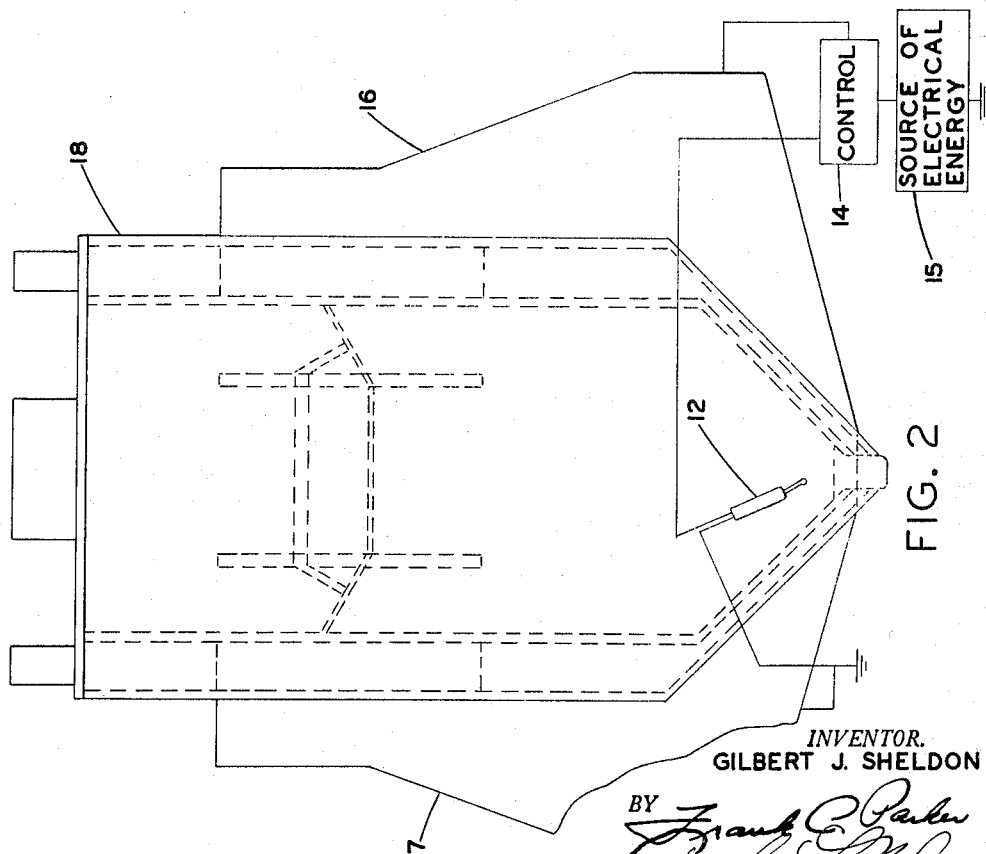
FIG. 2 is a schematic diagram illustrating the source of electrical energy and method of heating the molten glass.

Referring to FIG. 2 the pot for melting the glass is illustrated in connection with the control unit 14 and the source of electrical energy 15. The buss bars 16 and 17 supply adequate quantity of current to the pot 18. The pot 18 is constructed of a resistance material which operates as a heating element as current is passed from one buss bar to the other. The temperature of the pot 18 is maintained through the control unit 14 which accurately controls the current flow through the pot 18 and thereby maintains an accurate temperature in response to the thermocouples 12 and 13.

Figure 3:
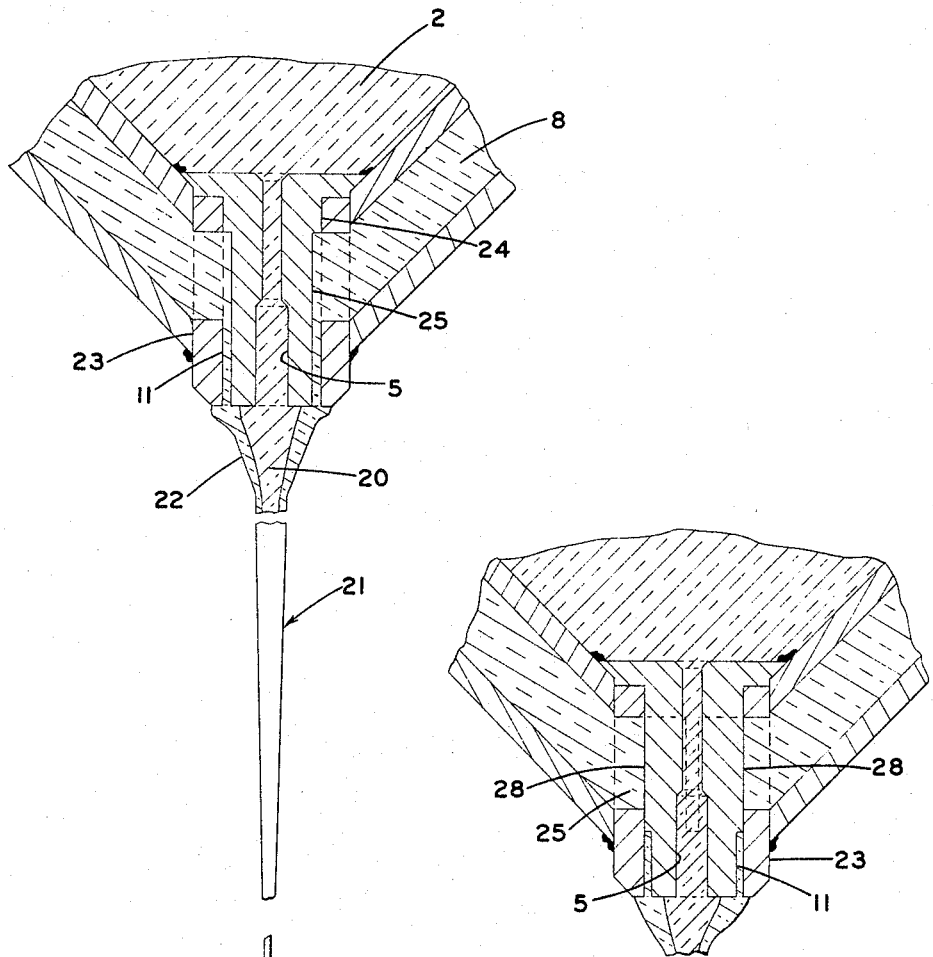
FIG. 3 is a diagram illustrating the formation of the glass fiber and the drawing means employed in the formation of the fiber.

Referring to FIG. 3 an enlarged cross section view of the orifice is shown. The body of glass 2 is in communication with the orifice 5 which forms the core 20 of the fiber 21. The molten glass 8 is in communication with the annular orifice 11 for forming of the coating 22 of the fiber 21. It is imperative that concentricity of the orifice be maintained to provide an even coating on the core of the fiber. The orifice 5 is accurately formed in the lower end of the pot 18. The sleeve 23 is formed with an accurate alignment with the shoulder 24 on the pot 18. These two elements are fitted together with a close tolerance and maintain concentricity of the orifice 11 relative to the orifice 5. The molten glass body 8 flows through the orifice 11 formed by the outer periphery of the spool 25 which receives the sleeve 23.

A winding device indicated by the pulley 27 driven by the motor 30 provides the proper concentricity of the fiber relative to the orifice, and speed for drawing of the fiber 21.

Figure 4:
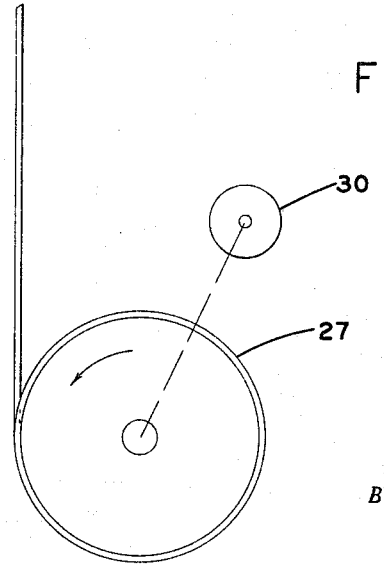
FIG. 4 is a cross section view illustrating the means for maintaining concentricity of the elements which form the glass orifice.

FIG. 4 is a cross section view of the orifice showing the means for maintaining concentricity of the sleeve 23 on the spool 25. The lands 28 engage the inner periphery of sleeve 23 to accurately align the sleeve with the spool. The assembly is welded to maintain a fixed concentricity of the orifices.

To draw a fiber having the desired coating thickness, a proportion of areas must be maintained between the orifice 11 and the orifice 5. The proportion of the orifice areas controls the coating thickness on the fiber.

The temperature of the bodies of molten glass must also be accurately maintained to provide the desired rate of flow. The rate of flow in turn controls the rate at which a fiber can be drawn from the orifices. A more fluid glass flowing from each of the orifices would permit a faster drawing rate of the fiber. It is understood that the fiber is drawn from the molten glass at a faster rate than would be present if no tensile force were placed on the fiber.

The fiber is drawn in the following described manner. The bodies of molten glass 2 and 8 are brought to a pretermined temperature to provide flow through the orifice under static conditions. The body in chamber 3 provides a supply of molten glass for the core 20 of the fiber 21. The molten glass 8 in the chamber 7 provides a supply for the coating 22 of the fiber 21. Under operating temperatures the glass would normally flow through the orifices and form a gob on the lower end of the orifices. The operating temperature is accurately maintained through the heat sensing thermocouples 12 and 13 connected to the control unit 14 which operates the flow of electrical energy from the source of electrical energy 15. The source of electrical energy is fed through the buss bars 16 and 17 to the pot 18 which is a resistance element which heats as a current is passed through the element. The pot 18 heats to the desired temperature in response to control by the control unit 14.

With the accurate maintenance of temperature the molten glass will flow through the orifices. The concentricity of the orifices assures an even, perfectly fused coating on the core of the fiber. The flow is initiated through the orifices by gravity and then a tension is applied to assist in drawing molten glass through both orifices simultaneously. The speed of drawing is controlled by the temperature of the molten glass in the bodies 2 and 8. The pulley 27 rotates at the desired speed and draws the fiber to the predetermined diameter in response to the rate of the rotation. Subsequent to drawing to the diameter desired, the fiber 21 is rolled on the pulley 27. A high rate of speed is achieved by maintaining the desired rate of flow and drawing through the orifice.

The above description specifically sets forth and illustrates the preferred embodiment of this invention. It is realized however that minor changes might still be devised whereby the spirit of the invention would be included. The following claims define the scope of the invention.

What is claimed is:
1. Apparatus for producing continuous coated optical fiber comprising:
   first and second chambers for receiving fiber-making material and having means for maintaining the fiber-making material in a molten state;
   center orifice means connected at an outlet portion of the first chamber for forming an optical fiber core from molten material flowing from the first chamber;
   annular orifice means evenly spaced peripheral to the center orifice means for forming a continuous optical fiber coating on the fiber core from molten material flowing from the second chamber;
   the center orifice means having land means for engaging inner peripheral portions of the annular orifice means adjacent terminal portions of the orifice means and the annular orifice means; and
   means for drawing molten material from the orifice means to form a coated optical fiber.
2. The apparatus of claim 1 having recessed means for forming a continuous optical fiber coating layer in the annular orifice means whereby molten material separated into discreet streams while passing the land means is recombined in the recessed means prior to emergence of the coated optical fiber from the orifice means.

References Cited by the Examiner

UNITED STATES PATENTS

| | | | |
|---|---|---|---|
| 830,201 | 9/1906 | Blandel | 18—13 |
| 1,529,947 | 3/1925 | Freese | 65—121 |
| 1,529,948 | 3/1925 | Freese | 65—145 |
| 1,828,226 | 10/1931 | Hiller | 65—121 |
| 1,920,336 | 8/1933 | Woods | 65—121 X |
| 1,920,366 | 8/1933 | De Silva | 65—45 |
| 2,052,269 | 8/1936 | Woods | 65—145 |
| 2,179,224 | 11/1939 | Soubier | 65—337 X |
| 2,243,194 | 5/1941 | Cook | 65—53 X |
| 2,264,245 | 11/1941 | Lytle | 65—145 |
| 2,274,986 | 3/1942 | Kilian et al. | 65—337 X |
| 2,313,296 | 3/1943 | Lamesch | 65—121 X |
| 2,328,998 | 9/1943 | Radford. | |
| 2,916,347 | 12/1959 | Russell | 65—3 |
| 2,972,837 | 2/1961 | Pinotti | 65—145 |
| 2,992,517 | 7/1961 | Hicks | 65—3 |
| 3,066,504 | 12/1962 | Harting et al. | 65—32 |
| 3,192,023 | 6/1965 | Stalego | 65—121 |
| 3,209,641 | 10/1965 | Upton | 65—121 |

FOREIGN PATENTS

| | | |
|---|---|---|
| 849,842 | 10/1939 | France. |
| 849,843 | 10/1939 | France. |
| 1,158,476 | 1/1958 | France. |
| 1,223,064 | 1/1960 | France. |
| 855,393 | 11/1960 | Great Britain. |

DONALL H. SYLVESTER, *Primary Examiner.*

F. W. MIGA, *Assistant Examiner.*